(12) United States Patent  
Takayama et al.

(10) Patent No.: US 10,473,774 B2  
(45) Date of Patent: Nov. 12, 2019

(54) PRECIPITATION DETERMINING DEVICE

(71) Applicant: DENSO CORPORATION, Kariya, Aichi-pref. (JP)

(72) Inventors: Takuya Takayama, Kariya (JP); Koji Shimizu, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 282 days.

(21) Appl. No.: 15/501,785

(22) PCT Filed: Aug. 7, 2015

(86) PCT No.: PCT/JP2015/072549  
§ 371 (c)(1),  
(2) Date: Feb. 3, 2017

(87) PCT Pub. No.: WO2016/021722  
PCT Pub. Date: Feb. 11, 2016

(65) Prior Publication Data  
US 2017/0227632 A1   Aug. 10, 2017

(30) Foreign Application Priority Data  
Aug. 8, 2014   (JP) .................................. 2014-162590

(51) Int. Cl.  
*G01S 13/34* (2006.01)  
*G01S 7/35* (2006.01)  
(Continued)

(52) U.S. Cl.  
CPC .............. *G01S 13/34* (2013.01); *G01S 7/354* (2013.01); *G01S 7/40* (2013.01); *G01S 7/412* (2013.01);  
(Continued)

(58) Field of Classification Search  
CPC .................................. G01S 13/34; G01S 7/354  
(Continued)

(56) References Cited

U.S. PATENT DOCUMENTS

| 2004/0183713 A1 | 9/2004 | Kumon et al. | |
| 2011/0050486 A1* | 3/2011 | Ishizawa | G01S 7/023 342/26 R |
| 2015/0070208 A1* | 3/2015 | Goto | G01S 13/48 342/26 R |

FOREIGN PATENT DOCUMENTS

| JP | 04309883 A | * 11/1992 |
| JP | H04-309883 A | 11/1992 |

(Continued)

*Primary Examiner* — Peter M Bythrow  
*Assistant Examiner* — Helena H Seraydaryan  
(74) *Attorney, Agent, or Firm* — Knobbe, Martens, Olson & Bear, LLP

(57) ABSTRACT

A radar device includes a transmission part that transmits a radar wave which has been frequency-modulated such that one measurement cycle has a rising section in which a frequency increases and a falling section in which a frequency decreases, a reception part that derives respective beat signals of the rising section and the falling section, and a signal processor that performs a precipitation determining process on the basis of an analysis of the beat signals. In the precipitation determining process, in the absence of objects other than precipitation objects from a transmission range of the radar wave, it is determined whether a spectral similarity of the frequency spectra of the rising and falling section with precipitation reference spectra is not less than a threshold, and if the spectral similarity is not less than the threshold as a result of the determination, it is determined that precipitation is present.

16 Claims, 11 Drawing Sheets

(51) Int. Cl.
*G01S 13/93* (2006.01)
*G01S 7/40* (2006.01)
*G01W 1/14* (2006.01)
*G01S 7/41* (2006.01)
*G01S 13/58* (2006.01)
*G01S 13/95* (2006.01)

(52) U.S. Cl.
CPC .......... *G01S 13/345* (2013.01); *G01S 13/584* (2013.01); *G01S 13/931* (2013.01); *G01S 13/95* (2013.01); *G01W 1/14* (2013.01); *G01S 2007/4039* (2013.01); *G01S 2013/9342* (2013.01); *G01S 2013/9346* (2013.01); *G01S 2013/9357* (2013.01); *G01S 2013/9375* (2013.01)

(58) Field of Classification Search
USPC ....................................................... 342/26 R
See application file for complete search history.

(56) References Cited

FOREIGN PATENT DOCUMENTS

| | | |
|---|---|---|
| JP | 3873967 B2 | 1/2007 |
| JP | 2014-109458 A | 6/2014 |
| JP | 2014109458 A * | 6/2014 |

* cited by examiner

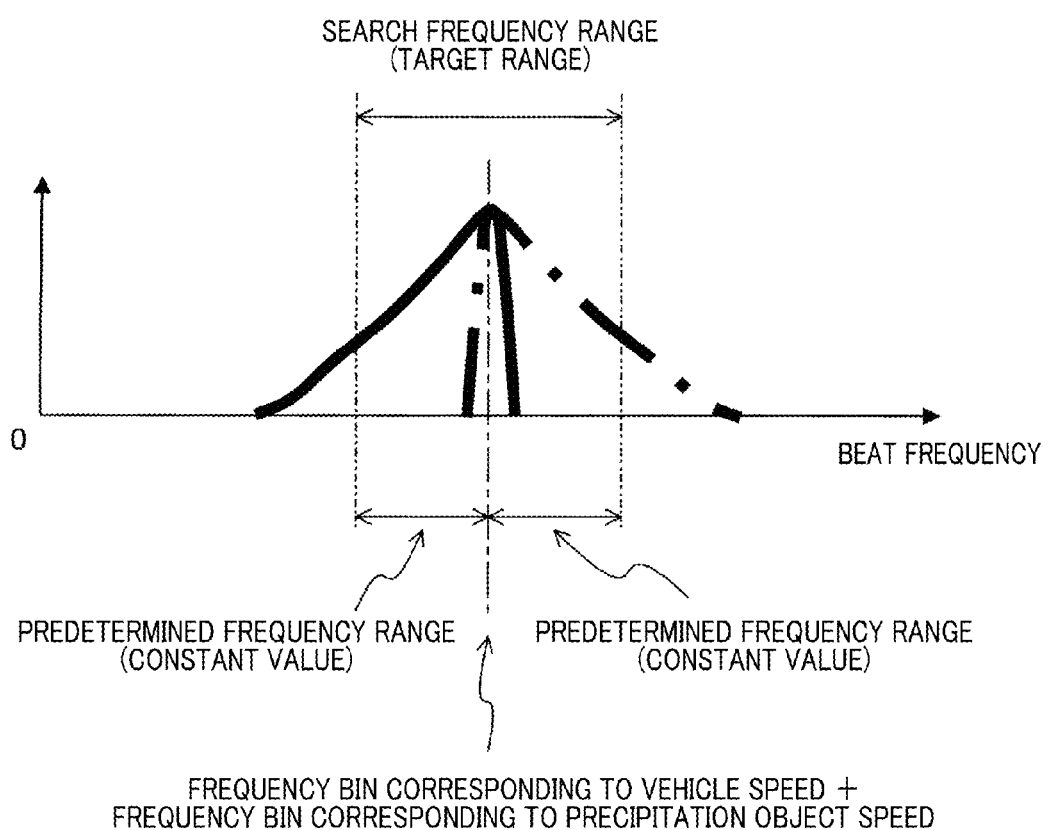

PRECIPITATION DETERMINING DEVICE

CROSS-REFERENCE TO RELATED APPLICATION

This application is based on and claims the benefit of priority from earlier Japanese Patent Application No. 2014-162590 filed Aug. 8, 2014, the description of which is incorporated herein by reference.

TECHNICAL FIELD

The present disclosure relates to a precipitation determining device that determines precipitation on the basis of the transmission/reception signal of a radar wave.

BACKGROUND ART

In-vehicle radar devices are well known. Such in-vehicle radar devices detect a position of each reflection point that reflects a radar wave, and the speed of each reflection point relative to the own vehicle, according to the transmission/reception signal of the radar wave (see PTL 1). The in-vehicle radar device described in PTL 1 determines whether each reflection point is a stationary object or a moving object on the basis of the speed of the reflection point relative to the own vehicle and the speed of the own vehicle.

In the in-vehicle radar device described in PTL 1, the weather is determined to be bad if the number of reflection points determined to be stationary objects is less than a criterion, which is the number of reflection points that have been determined to be stationary objects when the weather is fine.

CITATION LIST

Patent Literature

[PTL 1]
JP-B-3873967

SUMMARY OF THE INVENTION

Technical Problem

When the distance from the in-vehicle radar device to each of stationary objects is long, the number of reflection points of the radar wave from the stationary objects detected by the in-vehicle radar device is small, irrespective of what the weather is like. In this case, the number of reflection points of the radar wave from the stationary objects detected by the in-vehicle radar device is likely to coincide with the criterion. Thus, in the technique described in PTL 1, the weather may erroneously be determined to be fine, when the weather is actually bad (precipitation is present).

In other words, in the conventional technique of determining the presence/absence of precipitation, accuracy is required to be improved.

The present disclosure has an object of improving the accuracy in determining the presence/absence of precipitation in the technique of determining the presence/absence of precipitation.

Solution to Problem

A first invention made to accomplish the aforementioned object relates to a precipitation determining device (10) mounted to a mobile unit.

The precipitation determining device of the first invention includes a transmitting means (32, 33, 34, 36), a receiving means (40, 42, 43), an analyzing means (50, 84, S140), and a precipitation determining means (50, 84, S350 to S380).

Of these components, the transmitting means transmits a radar wave which has been frequency-modulated such that one measurement cycle has a rising section in which a frequency increases with time and a falling section in which a frequency decreases with time.

The receiving means receives an incoming wave which is a reflected wave of a radar wave transmitted from the transmitting means, and mixes the received incoming wave with the radar wave transmitted from the transmitting means to derive respective beat signals of the rising section and the falling section.

The analyzing means performs frequency analysis of the beat signals generated by the receiving means and derives respective frequency spectra of the beat signals for the rising section and the falling section.

The precipitation determining means determines whether a spectral similarity is not less than a predetermined threshold if the frequency analysis performed by the analyzing means indicates the absence of objects other than precipitation objects from a transmission range of the radar wave. If the determination results in the spectral similarity being not less than the predetermined threshold, precipitation is determined to be present. The spectral similarity herein refers to a similarity of the frequency spectra with precipitation reference spectra. The frequency spectra are derived from the rising section and the falling section generated by the analyzing means. The precipitation reference spectra exhibit a lower frequency intensity, meaning a longer distance to a source of an incoming wave, and a higher frequency intensity, meaning a shorter distance to the source of an incoming wave.

According to the precipitation determining device of the first invention, the presence/absence of precipitation can be determined, irrespective of whether the reflection point of the radar wave is a stationary object, and irrespective of the number of reflection points corresponding to stationary objects.

Therefore, the precipitation determining device of the first invention can reduce the probability of erroneously determining the weather to be fine when the weather is actually bad (precipitation is present).

The precipitation determining device of the first invention determines, in the absence of objects other than precipitation objects from the transmission range of the radar wave, as to whether the similarity (spectral similarity) of the frequency spectra of the rising and falling sections with the precipitation reference spectra is not less than the predetermined threshold.

If the similarity is not less than the predetermined threshold as a result of the determination, the precipitation determining device of the first invention determines precipitation to be present.

In other words, the precipitation determining device of the first invention uses frequency spectra of only the incoming wave obtained in the absence of objects other than precipitation objects to thereby determine the presence/absence of precipitation.

Therefore, the precipitation determining device of the first invention can prevent the presence/absence of precipitation from being determined in a state where the incoming waves from precipitation objects are embedded in the incoming waves from objects other than the precipitation objects.

As will be understood from the above, the precipitation determining device of the first invention can prevent deterioration of accuracy in determining the presence/absence of precipitation, and can further improve accuracy.

It should be noted that the objects other than precipitation objects of the first invention include objects on the road, and architectural structures in the vicinity of the road, and thus include, for example, automobiles or roadside objects, traffic signals, pedestrians, houses, buildings, and the like. Moreover, the precipitation objects of the first invention include raindrops, snowflakes, snowy raindrops, and the like.

The inventors of the present invention have conducted intensive studies and found that, in the frequency spectra of the beat signals derived through in-phase detection of only the incoming waves from precipitation objects, a difference in highest intensity peak between the rising and falling sections falls within a predetermined range. Furthermore, the inventors have found that, in the frequency spectra of the beat signals in this case, the frequency spectra in the rising and falling sections each exhibit a lower frequency intensity, meaning a longer distance to the precipitation object and the frequency spectra are line symmetric about the highest intensity peaks as a symmetric axis.

Accordingly, the receiving means of the first invention may receive the incoming wave by in-phase detection.

In this case, the precipitation determining means of the first invention may determine that the spectral similarity is not less than a predetermined threshold if the difference in highest intensity peak between the rising and falling sections falls within a predetermined range, and the frequency spectra of the rising and falling sections each exhibit a lower frequency intensity, meaning a longer distance to the source of an incoming wave and the frequency spectra are line symmetric with respect to the highest intensity peaks as a symmetric axis.

It should be noted that the frequency peak herein refers to a maximum frequency component in each of frequency spectra derived by the analyzing means. Moreover, the highest intensity peak refers to a frequency component of a frequency peak with a highest intensity among the frequency peaks.

According to the precipitation determining device described above, if the frequency spectra each exhibit a frequency and a frequency intensity distribution as set forth above, precipitation is determined to be present.

A second invention made to accomplish the aforementioned object relates to a precipitation determining device mounted to a mobile unit.

The precipitation determining device of the second invention includes a transmitting means (32, 33, 34, 36), a receiving means (40, 42, 43), an azimuth deriving means (50, 84, S150), and a precipitation determining means (50, 84, S390).

The transmitting means of the second invention transmits a radar wave in a predetermined measurement cycle. The receiving means receives an incoming wave, which is a reflected wave of a radar transmitted by the transmitting means, using at least two or more reception antennas.

The azimuth deriving means derives azimuth information in each measurement cycle on the basis of an incoming wave received by the receiving means, the azimuth information indicating an azimuth in which the source of the incoming wave is present.

The precipitation determining means calculates a correlation between pieces of the azimuth information derived by the azimuth deriving means in the measurement cycles, and determines precipitation to be present if the calculated correlation is not more than a preset threshold.

If the source of the incoming wave is a vehicle, a roadside object, or the like, the positional variation of these objects is small and hence correlation is strong, in terms of temporal transition, between pieces of the azimuth information. On the other hand, if the source of the incoming wave is a precipitation object such as a raindrop or a snowflake, the position of the precipitation object randomly varies. Since the positional variation with time of the precipitation object is large, correlation becomes weak, in terms of temporal transition, between pieces of the azimuth information.

The precipitation determining device of the second invention utilizing such characteristics can determine the presence/absence of precipitation, irrespective of whether the reflection point of the radar wave is a stationary object, and irrespective of the number of reflection points corresponding to stationary objects.

Thus, the precipitation determining device can reduce the probability of erroneously determining the weather to be fine when the weather is actually bad (precipitation is present), and further, can improve the accuracy of determining the presence/absence of precipitation.

It should be noted that the bracketed reference signs in the Claims and in the Solution to Problem each show a correspondency with a practical means of the following embodiments each described as a mode, and should not be construed as limiting the technical scope of the present invention.

BRIEF DESCRIPTION OF DRAWINGS

FIG. 5 is a diagram illustrating a method of determining a search frequency range.

DESCRIPTION OF EMBODIMENTS

With reference to the drawings, hereinafter will be described some embodiments of the present invention.

(In-Vehicle System)

Figure 1:
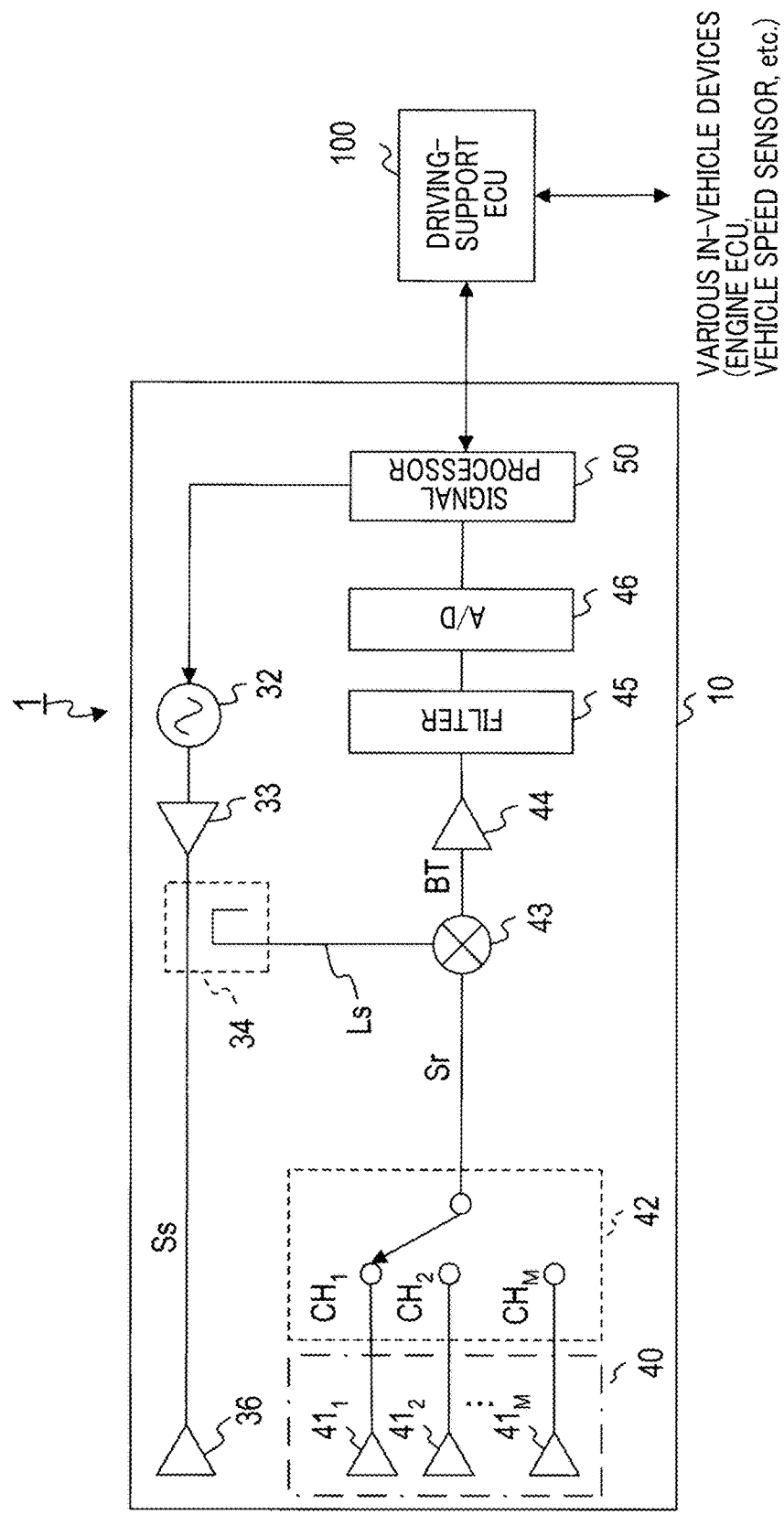
FIG. 1 is a block diagram illustrating a schematic configuration of a radar device according to an embodiment.

FIG. 1 shows an in-vehicle system 1 including a radar device 10 and a driving-support ECU 100, and mounted to a mobile object such as a four-wheel automobile.

The radar device 10 transmits continuous waves composed of electromagnetic waves of a millimeter wave band, as a radar wave, and detects a target that has reflected the radar wave, on the basis of the reception signal of the reflected radar wave (incoming wave), while determining the presence/absence of precipitation.

The target referred to herein includes an object on the road, an architectural structure in the vicinity of the road, and a precipitation object. An object referred to herein includes, for example, an automobile, a roadside object, a traffic signal, a pedestrian, and the like. The architectural structure referred to herein includes, for example, a house, a building, and the like. The precipitation object herein refers to liquid water or solid water that falls or floats in the atmosphere by gravity, and includes, for example, a raindrop, a fog drop, a snowflake, a snowy raindrop, and the like.

The driving-support ECU 100 performs various processes on the basis of information (Lz, Vz, θz) on a target, inputted from the radar device 10, the processes including a process for supporting a driver's vehicle driving, a process of transmitting information to an externally installed device, and the like. The process relating to driving support includes, for example, a process of displaying or warning the driver that there is an approaching object, a process of controlling a brake system, a steering system, or the like to thereby perform vehicle control for avoiding a collision with the approaching object, and the like.

The information transmitted in the information transmitting process herein may also include, for example, information correlating the own vehicle position (e.g., latitude and longitude) specified by a position detector, not shown, with the presence/absence of precipitation. The destination to which the information is transmitted in the information transmitting process may also be, for example, a server that collects information from the in-vehicle systems 1 mounted to individual automobiles.

(Radar Device)

The radar device 10 includes an oscillator 32, an amplifier 33, a divider 34, and a transmission antenna 36.

The oscillator 32 generates a high frequency signal of a millimeter wave band modulated so as to have, as one measurement cycle, a rising section in which the frequency of an alternating-current signal linearly increases with time (increases gradually), and a falling section in which the frequency of the alternating-current signal linearly decreases with time (decreases gradually).

The amplifier 33 amplifies the high frequency signal generated by the oscillator 32. The divider 34 divides power of an output of the amplifier 33 into a transmission signal Ss and a local signal Ls. The transmission antenna 36 radiates a radar wave corresponding to the transmission signal Ss.

The radar device 10 further includes a reception antenna unit 40, a reception switch 42, a mixer 43, an amplifier 44, a filter 45, an A/D converter 46, and a signal processor 50.

The reception antenna unit 40 has an array antenna including M antennas $41_1$ to $41_M$ (M is a natural number not less than 2) which receive a radar wave. The antennas $41_1$ to $41_M$ are allocated with channels $CH_1$ to $CH_M$, respectively.

The reception switch 42 sequentially selects any of the antennas $41_1$ to $41_M$ to supply a reception signal Sr derived from the selected one of the antennas $41_1$ to $41_M$ to the subsequent stage.

The mixer 43 mixes the reception signal Sr with the local signal Ls to generate a beat signal BT indicating a frequency difference between the transmission signal Ss and the reception signal Sr. The amplifier 44 amplifies the beat signal BT supplied from the mixer 43. The filter 45 removes unnecessary signal components from the beat signal BT generated by the mixer 43. The A/D converter 46 samples an output of the filter 45 for conversion into digital data.

The signal processor 50 includes at least one well-known microcomputer including at least a ROM, a RAM, and a CPU. Furthermore, the signal processor 50 includes at least one processing unit (e.g., DSP) for performing a fast Fourier transform (FFT) process or the like for the data retrieved via the A/D converter 46.

The signal processor 50 starts or stops the oscillator 32, or controls sampling of the beat signal BT via the A/D converter 46.

In addition to this, the signal processor 50 uses sampled data of the beat signal BT to detect the position of the target that has reflected the radar wave to thereby generate information on the target (hereinafter referred to as target information), while performing a target detecting process for determining the presence/absence of precipitation. Furthermore, the signal processor 50 performs an information communication process of transmitting/receiving information to/from the driving-support ECU 100, the information including the information (e.g., vehicle speed and the like) required for the target detecting process and the target information obtained as a result of the target detecting process.

The ROM of the signal processor 50 stores therein a processing program for the signal processor 50 to perform the target detecting process.

In other words, the radar device 10 functions as the precipitation determining device recited in the claims.

The radar device 10 acquires information required for performing the target detecting process from various in-vehicle devices via the driving-support ECU 100. The in-vehicle devices include a vehicle speed sensor that detects a vehicle speed of the own vehicle and a steering angle sensor that detects a steering angle of the own vehicle.

(Overview of Radar Device Operation)

In the radar device 10, when the oscillator 32 oscillates according to a command from the signal processor 50, the divider 34 divides power of the high frequency signal generated by the oscillator 32 and amplified by the amplifier 33 to thereby generate the transmission signal Ss and the local signal Ls. The radar device 10 transmits the transmission signal Ss among these signals, as a radar wave, via the transmission antenna 36.

A reflected wave (i.e., incoming wave) of the radar wave forwarded from the transmission antenna 36 is then received by all of the antennas $41_1$ to $41_M$ configuring the reception antenna unit 40, and only the reception signal Sr of the reception channel $CH_i$ (i=1 to M) selected by the reception switch 42 is supplied to the mixer 43. In the mixer 43, the reception signal Sr in question is mixed with the local signal Ls derived from the divider 34 to thereby generate the beat signal BT. The beat signal BT in question is removed with unnecessary signal components by the filter 45, and then sampled by the A/D converter 46 and retrieved by the signal processor 50.

The reception switch 42 is switched such that the channels $CH_1$ to $CH_M$ are all selected by a predetermined number of times (e.g., 512 times) during one measurement cycle of the radar wave. The A/D converter 46 performs sampling in synchrony with the switching timing. In other words, during one measurement cycle of the radar wave, the sampled data is accumulated for each of the channels $CH_1$ to $CH_M$ and for each of the rising and falling sections of the radar wave.

Based on the sampled value of the beat signal BT, the signal processor 50 detects the target that has reflected the radar wave, while deriving a distance Lz to each of the targets, a relative speed Vz of each target relative to the own vehicle, and an azimuth θz in which the target is present (hereinafter referred to as incoming azimuth). Then, the signal processor 50 outputs, to the driving-support ECU 100 and the like, information including the information on each target (distance Lz, relative speed Vz, and incoming azimuth θz) as target information.

As described above, the radar device 10 is configured as a so-called FMCW (frequency-modulated continuous-wave) radar.

(Target Detecting Process)

Next, the target detecting process performed by the signal processor 50 of the radar device 10 will be described.

The target detecting process is started at a predetermined measurement cycle.

Figure 2:
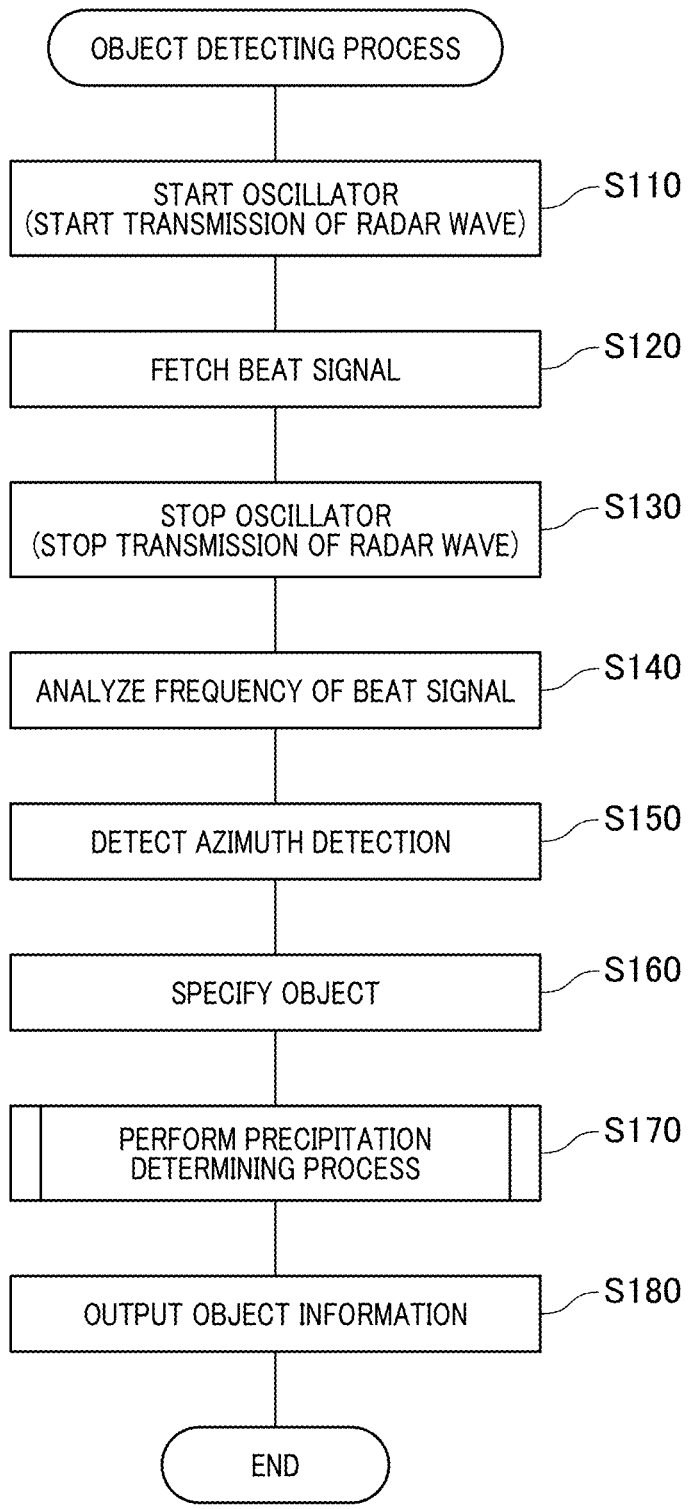
FIG. 2 is a flowchart illustrating a process of an object detecting process executed by the radar device.

As shown in FIG. 2, when the target detecting process is started, the oscillator 32 is started first so as to start transmission of a radar wave (S110). Subsequently, a sampled value of the beat signal BT is acquired via the A/D converter 46 (S120). When a required number of sampled values are acquired, the oscillator 32 is stopped to thereby stop transmission of the radar wave (S130).

In the target detecting process, frequency analysis (FFT process in the present embodiment) is conducted for the sampled values of the beat signals BT acquired at S120, and a power spectrum of the beat signal BT is calculated for each of the reception channels $CH_1$ to $CH_M$ and each of the rising/falling sections (S140). The power spectrum indicates frequencies included in the beat signal BT and intensities of the respective frequencies, and is an example of the frequency spectrum recited in the claims.

At S140, frequency peaks $fbu_1$ to $fbu_m$ on the power spectrum are detected for the rising section, and at the same time, frequency peaks $fbd_1$ to $fbd_m$ on the power spectrum are detected for the falling section. The frequency peak fbu or fbd is a frequency component (frequency bin) that becomes maximum in a frequency spectrum. The detected frequency peaks fbu and fbd each imply possible presence of a candidate of a target that has generated the reflected wave (hereinafter referred to as a target candidate).

Subsequently, in the target detecting process, the azimuth detection process is performed for each of the frequency peaks fbu and fbd to estimate an incoming azimuth of each target candidate corresponding to the frequency peak fbu or fbd, and estimate an incoming power indicating a reception power of the incoming wave from the target candidate (S150). The method that can be used as the azimuth detection process includes, for example, a method of detecting a phase difference of a signal received by the antennas 41 to detect the azimuth of the target. For example, the method may be well-known MUSIC (multiple signal classification), digital beam forming, or the like. The incoming azimuth in the present embodiment refers to an azimuth (angle) in which a target is present, relative to a reference axis set in the radar device 10.

The signal processor 50 performs a target specifying process of specifying a target on the basis of the incoming azimuth and the incoming power, which have been estimated at S150 (S160). At S160, at least pair matching and a historical connection process are performed.

Pair matching herein refers to a process of finding a match between the frequency peaks $fbu_1$ to $fbu_m$ calculated from the beat signal BT of a rising section and the frequency peaks $fbd_1$ to $fbd_m$ calculated from the beat signal BT of a falling section, the matched peaks being taken to be reflections of the radar wave from the same object, and registered as matched peaks. A set of frequency peaks fbu and fbd matched through pair matching and registered is hereinafter referred to as frequency pair.

Specifically, in the pair matching of the present embodiment, it is determined whether the incoming power difference and the angle difference of an incoming azimuth each fall within a predetermined allowable range, for all the combinations of the frequency peaks fbu of a rising section with the frequency peaks fbd of a falling section. If it is determined resultantly that the incoming power difference and the angle difference of the incoming azimuth both fall within respective allowable ranges, the set of corresponding frequency peaks is taken to be a frequency pair.

In the pair matching of the present embodiment, the distance Lz from the radar device 10 to the target candidate, and the relative speed Vz between the target candidate and the own vehicle are derived for each of the registered frequency pairs, using a technique well known in the FMCW-scheme radar device. Furthermore, in the pair matching of the present embodiment, the relative speed Vz between each target candidate and the own vehicle is subtracted from the own vehicle speed to derive a speed of the target candidate. In addition, in the pair matching, information including the derived distance Lz, the relative speed (speed) Vz and the azimuth θz in which the target candidate is present is correlated to each frequency pair and registered as a target candidate.

In the historical connection process of the present embodiment, a frequency pair corresponding to an identical target is detected on the basis of the information (i.e., distance Lz, relative speed Vz, azimuth θz and the like) on the this-time frequency pairs registered in the measurement cycle (hereinafter referred to as present cycle pairs) and the information on the previous-time frequency pairs registered in the measurement cycle (hereinafter referred to as previous cycle pairs).

Specifically, in the historical connection process, a predicted position and a predicted speed of a present cycle pair corresponding to the previous cycle pair are calculated on the basis of the information on the previous cycle pair. If the differences of the predicted position and the predicted speed from the respective detected position and the detected speed calculated from the present cycle pair (i.e., position difference and speed difference) are smaller than respective preset upper limits (i.e., upper limit position difference and upper limit speed difference), it is determined that there is a historical connection. The frequency pair determined to have historical connection over a plurality of measurement cycles (e.g., five cycles) is recognized as a fixed target. The present cycle pair inherits the information (e.g., the number of times of historical connections) on the previous cycle pair having historical connection.

Subsequently, in the target detecting process, the signal processor 50 performs a precipitation determining process of determining the presence/absence of precipitation (S170).

Furthermore, in the target detecting process, the signal processor 50 outputs the target information ($L_z$, $V_z$, $\theta_z$) on the fixed target recognized at S160 and precipitation information, which will be specifically described later, to the driving-support ECU 100 (S180).

After that, the target detecting process of the present cycle is terminated.

(Precipitation Determining Process)

Next, the precipitation determining process performed by the signal processor 50 in the radar device 10 will be described.

Figure 3:
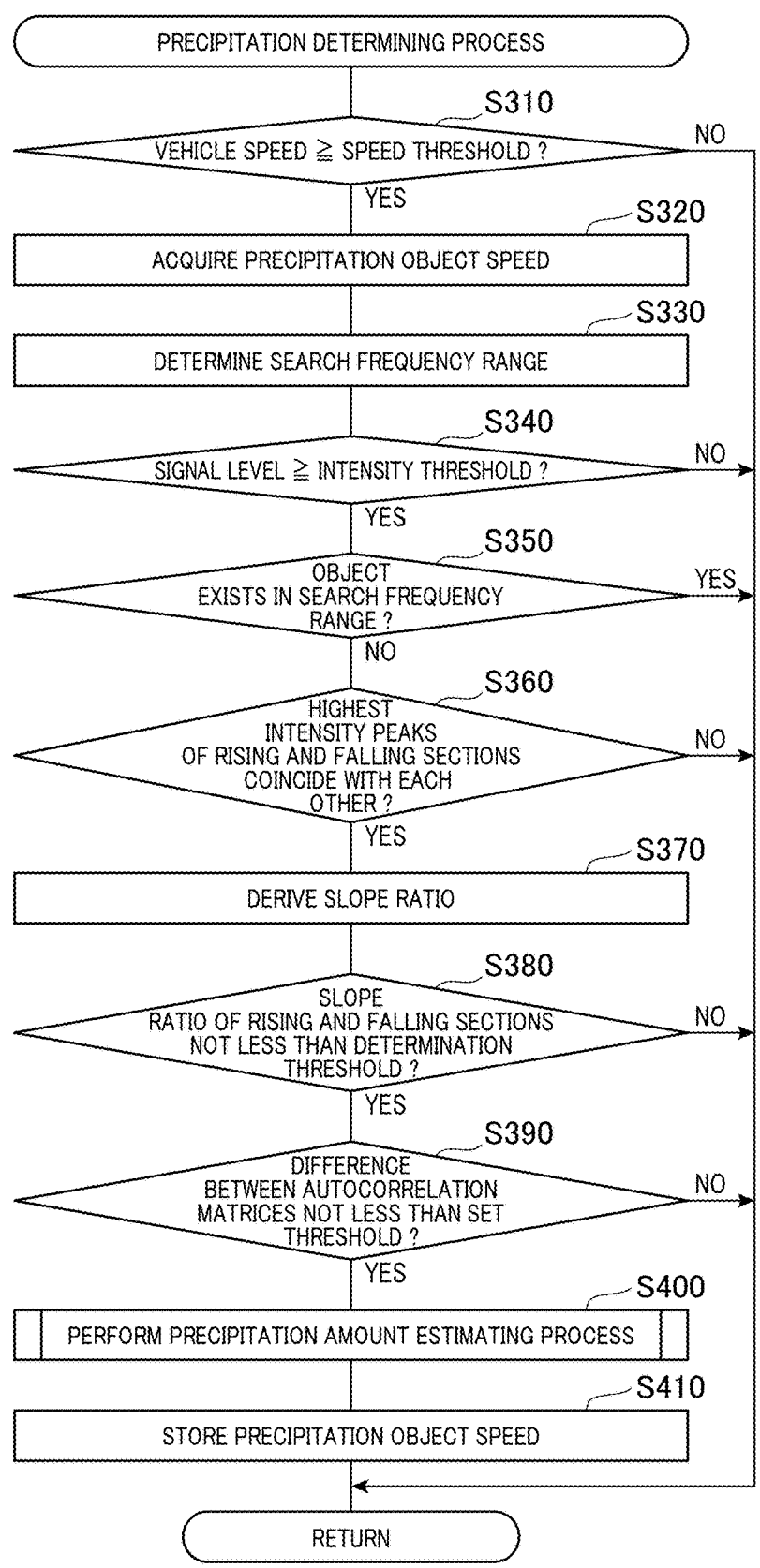
FIG. 3 is a flowchart illustrating a process of a precipitation determining process.

When the precipitation determining process is started at S170 of the target detecting process, the signal processor 50 determines first, as shown in FIG. 3, whether the vehicle speed of the own vehicle is not less than a predetermined speed threshold (S310). The speed threshold herein refers to an upper limit of what is taken to be a vehicle's reduced speed.

Figure 4A:
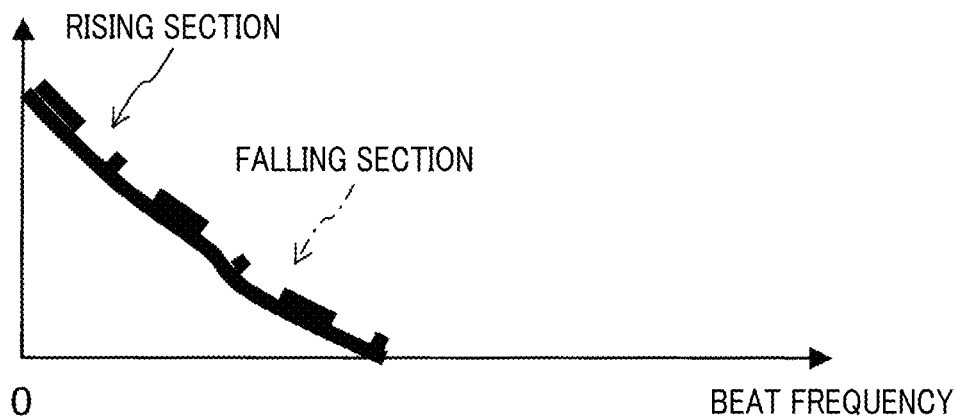
FIG. 4A is a diagram illustrating speed conditions in the precipitation determining process showing frequency spectra when the vehicle speed is 0.

If the speed of the own vehicle is determined, at S310, to be less than the speed threshold (NO at S310), the precipitation determining process is terminated, and the process returns to the target detecting process. This is because, as shown in FIG. 4A, if the speed of the own vehicle is less than the speed threshold, the power spectral envelope of the beat signal BT of the rising section approximately coincides with the power spectral envelope of the beat signal BT of the falling section, making it difficult to determine whether the precipitation requirements described later are satisfied.

Figure 4B:
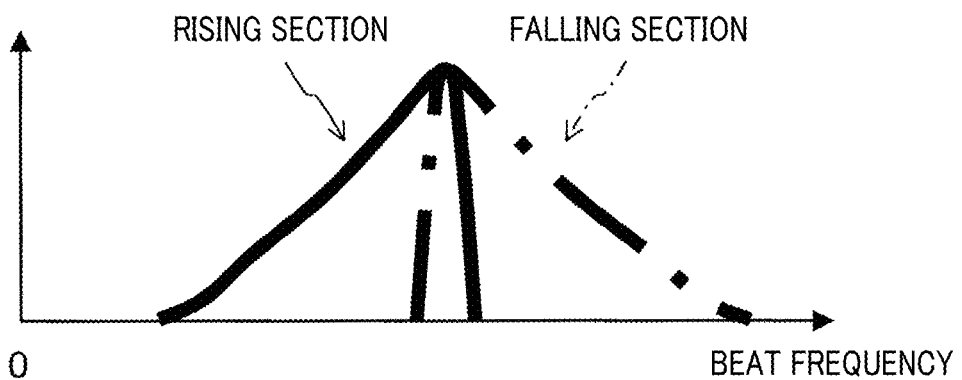
FIG. 4B is a diagram illustrating speed conditions in the precipitation determining process showing frequency spectra when the vehicle speed is not more than a speed threshold.

On the other hand, if the speed of the own vehicle is determined, at S310, to be not less than the speed threshold (YES at S310), the process proceeds to S320. This is because, as shown in FIG. 4B, if the own vehicle is regarded as running at a speed of not less than the speed threshold, the power spectral envelope of the beat signal BT of the rising section does not coincide with the power spectral envelope of the beat signal BT of the falling section, enabling determination as to whether the precipitation requirements described later are satisfied.

At S320, a precipitation object speed is acquired. The precipitation object speed herein refers to a speed at which the precipitation object moves toward the radar device 10, the speed being calculated at S410 if precipitation is determined to be present in the present precipitation determining process.

Subsequently, a specific frequency range of a power spectrum is determined as a search frequency range (S330). As shown in FIG. 5, in determining a search frequency range of the present embodiment, a frequency (distance FFT bin) corresponding to the speed of the own vehicle is corrected in terms of a frequency corresponding to the previous-time precipitation object speed acquired at S320 to obtained a corrected frequency (distance FFT bin), and the corrected frequency is determined as a center frequency, in the frequency spectrum of each of the rising and falling sections. The correction referred to herein includes adding the frequency corresponding to the precipitation object speed to the frequency corresponding to the speed of the own vehicle, or subtracting the latter from the former.

Based on the center frequency determined as described above, a predetermined frequency range is determined as a search frequency range. The predetermined frequency range referred to herein includes a frequency range corresponding to varying distances of a precipitation object, or a frequency range having a high probability of a precipitation object being present.

The search frequency range of the present embodiment is an example of the target range recited in the claims.

Subsequently, it is determined whether a reception intensity of a highest intensity peak in each of the rising and falling sections is not less than a predetermined intensity threshold (S340). The highest intensity peak refers to a frequency peak with a highest intensity (i.e., highest reception intensity) among the frequency peaks $fbu_1$ to $fbu_m$, or among the frequency peaks $fbd_1$ to $fbd_m$.

If it is determined, at S340, that the reception intensity of the highest intensity peak is less than the intensity threshold (NO at S340), the precipitation determining process is terminated, and the process returns to the target detecting process. On the other hand, if it is determined, at S340, that the reception intensity of the highest intensity peak is not less than the intensity threshold (YES at S340), the process proceeds to S350.

At S350, it is determined whether a frequency peak indicating a target other than a precipitation object is included in the search frequency range set at S330. Specifically, at S350, if a fixed target specified at previous S160 is included in the distance range corresponding to the search frequency range of the rising or falling section, it is determined that the frequency peak indicating a target is included in the search frequency range.

If it is determined, at tis S350, that a frequency peak indicating a target is included in the search frequency range (YES at 350), the precipitation determining process is terminated, and the process returns to the target detecting process. On the other hand, if it is determined, at S350, that a frequency peak indicating a target is not included in the search frequency range (NO at S350), the process proceeds to S360.

At S360, it is determined whether a frequency difference and a frequency intensity difference between the highest intensity peaks of the rising and falling sections each fall within a predetermined range. The predetermined range herein refers to a frequency range or a frequency intensity range in which the frequency difference or the frequency intensity difference can be taken to be 0.

If it is determined, at S360, that the frequency difference and the frequency intensity difference between the highest intensity peaks of the rising and falling sections each exceed the predetermined range (NO at S360), namely, the highest intensity peaks of the rising and falling sections do not coincide with each other, the precipitation determining process is terminated, and the process returns to the target detecting process. On the other hand, if it is determined, at S360, that the frequency difference and the frequency intensity difference between the highest intensity peaks of the rising and falling sections each fall within the predetermined range (YES at S360), namely, the highest intensity peaks of the rising and falling sections coincide with each other, the process proceeds to S370.

At S370, the signal processor 50 derives a slope ratio RRu of the search frequency range of the rising section and a slope ratio RRd of the search frequency range of the falling section.

Specifically, the slope ratio RRu is derived according to the following Formula (1), while the slope ratio RRd is derived according to the following Formula (2).

[Math. 1]

$$RRu = DSu/DLu \quad (1)$$

$$RRd = DLd/DSd \quad (2)$$

In Formula (1), DSu is a rising short-range depth in the frequency spectrum of the rising section, while DLu is a rising long-range depth in the frequency spectrum of the rising section.

Figure 6A:
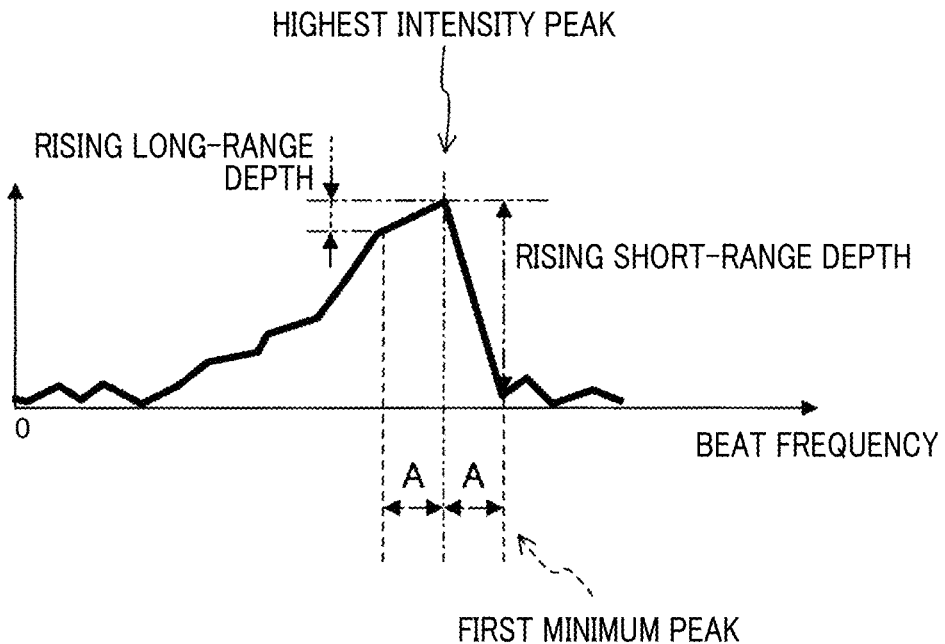
FIG. 6A is a diagram illustrating a requirement for determining the presence/absence of precipitation showing a frequency spectrum in a rising section during precipitation.

As shown in FIG. 6A, the rising short-range depth herein refers to a difference in frequency intensity between a highest intensity peak and a first minimum peak of the rising section. The first minimum peak herein refers to a frequency component (frequency bin) that firstly becomes minimum in the frequency spectrum of the rising section, starting from the highest intensity peak toward a short-range direction. Hereinafter, the frequency difference between the highest intensity peak and the first minimum peak will be referred to as peak distance A.

The rising long-range depth herein refers to a difference in frequency intensity between a highest intensity peak of the rising section and a first specific frequency component (frequency bin) of the frequency spectrum of the rising section. The first specific frequency component herein refers to a frequency obtained by shifting a highest intensity peak of the frequency spectrum of the rising section toward a long-range direction by a frequency corresponding to the peak distance A.

In Formula (2), a DSd is a falling short-range depth in the frequency spectrum of the falling section, while DLd is a falling long-range depth of the frequency spectrum of the falling section.

Figure 6B:
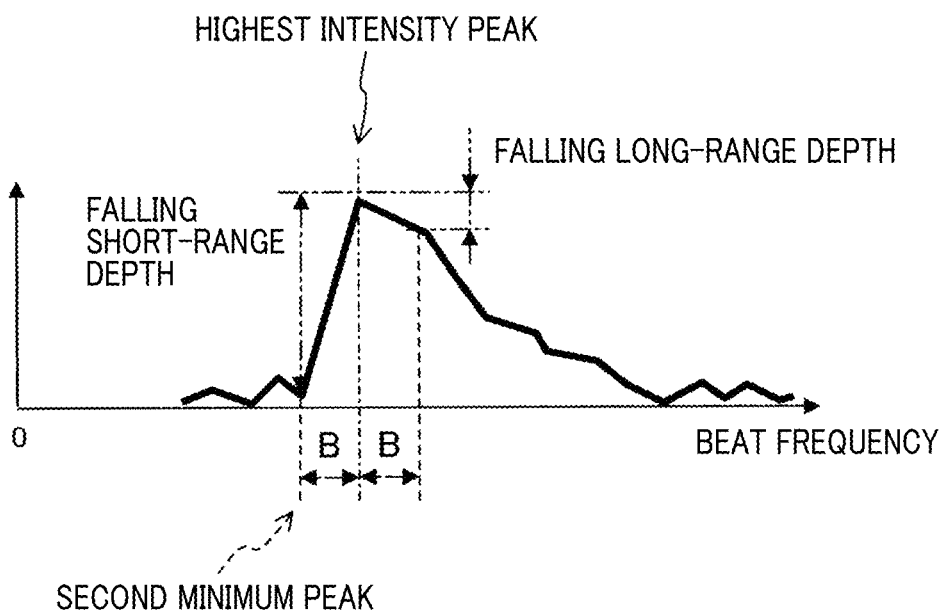
FIG. 6B is a diagram illustrating a requirement for determining the presence/absence of precipitation showing a frequency spectrum in a falling section during precipitation.

As shown in FIG. 6B, the falling short-range depth herein refers to a difference in frequency intensity between a highest intensity peak and a second minimum peak of the falling section. The second minimum peak herein refers to a frequency component (frequency bin) that firstly becomes minimum in the frequency spectrum of the falling section, starting from the highest intensity peak toward a short-range direction. Hereinafter, the frequency difference between the highest intensity peak and the second minimum peak will be referred to as peak distance B.

The falling long-range depth herein refers to a difference in frequency intensity between a highest intensity peak of the falling section and a second specific frequency component (frequency bin) of the frequency spectrum of the falling section. The second specific frequency component herein refers to a frequency obtained by shifting a highest intensity peak of the frequency spectrum of the falling section toward a long-range direction by a frequency corresponding to the peak distance B.

Subsequently, in the precipitation determining process, it is determined whether both of the slope ratios RRu and RRd are not less than a predetermined determination threshold (S380). If it is determined, at S380, that at least one of the slope ratios RRu and RRd is less than the determination threshold (NO at S380), the precipitation determining process is terminated, and the process returns to the object detecting process. On the other hand, if it is determined, at S380, that both of the slope ratios RRu and RRd are not less than the determination threshold (YES at S380), the process proceeds to S390.

In other words, the process proceeds to S390 if, at S380 of the precipitation determining process, the frequency spectra of the rising and falling sections exhibit a lower frequency intensity, meaning a longer distance, and if the frequency spectral envelopes of the rising and falling sections are line symmetric with respect to the highest intensity peaks as the symmetric axis.

At S390, it is determined whether an autocorrelation matrix normalization error DD is not less than a threshold set in advance. The set threshold referred to herein is set as a minimum value of an autocorrelation matrix normalization error when the weather condition includes precipitation.

At S390, the autocorrelation matrix normalization error DD is derived according to the following Formula (3).

[Math. 2]

$$DD = \frac{\sum_i \mathrm{abs}(R_i^1 - R_i^2)}{\sum_i [\mathrm{abs}(R_i^1) + \mathrm{abs}(R_i^2)]} \quad (3)$$

It should be noted that $R^1_i$ in Formula (3) is an autocorrelation matrix of a signal received by a reception antenna $40_i$ at time t, and $R^2_i$ is an autocorrelation matrix of a signal received by the reception antenna $40_i$ at time $t+\Delta t$. $\Delta t$ herein refers to a duration of time corresponding to one measurement cycle, and abs indicates an absolute value.

Figure 7A:
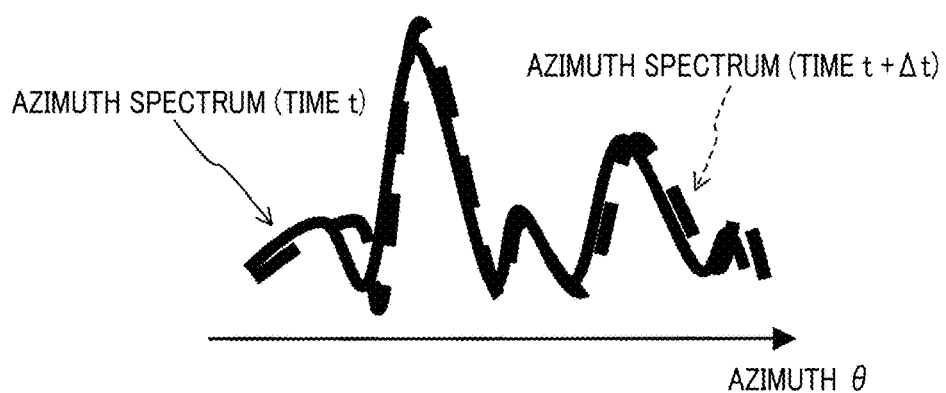
FIG. 7A is a diagram illustrating a requirement for determining the presence/absence of precipitation showing transition of azimuth spectra during non-precipitation.
Figure 7B:
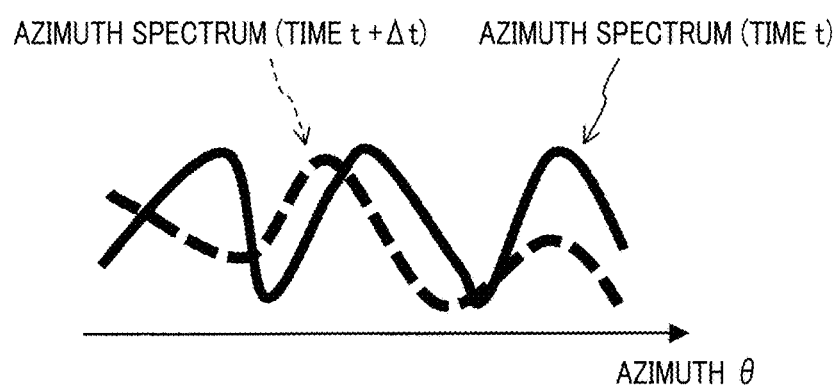
FIG. 7B is a diagram illustrating a requirement for determining the presence/absence of precipitation showing transition of azimuth spectra during non-precipitation.

In other words, if the source of an incoming wave is an object such as a vehicle or a roadside object, positional variation of the object in one measurement cycle is small. Therefore, as shown in FIG. 7A, there is a strong correlation, in terms of temporal transition, between the azimuths θ in which the object is present. The vertical axis of FIG. 7 represents spectrum intensity. On the other hand, if the source of an incoming wave is a precipitation object, the position of the precipitation object randomly varies with time in one measurement cycle. In addition, the positional variation of the precipitation object is large, and hence as shown in FIG. 7B, there is a weak correlation, in terms of temporal transition, between the azimuths θ in which the precipitation object is present. The temporal transition of the azimuth, namely, the temporal transition of the azimuth spectrum, referred to herein is an example of the azimuth information recited in the claims.

In the precipitation determining process, if it is determined, at S390, that the autocorrelation matrix normalization error DD is less than the set threshold (NO at S390), the precipitation determining process is terminated, and the process returns to the target detecting process. On the other hand, if it is determined, at S390, that the autocorrelation matrix normalization error DD is not less than the set threshold (YES at S390), the process proceeds to S400.

At subsequent S400, the signal processor 50 performs a precipitation amount estimating process, which will be specifically described later. The precipitation amount estimating process is performed to estimate a precipitation amount per unit time.

Then, in the precipitation determining process, the signal processor 50 calculates a precipitation object speed (S410). Further, at S410, precipitation information including a precipitation amount estimated in the precipitation amount estimating process and the calculated precipitation object speed are stored. The precipitation object speed at S410 may be calculated by calculating a relative speed between each precipitation object and the own vehicle, and subtracting the relative speed between the precipitation object and the own vehicle from the speed of the own vehicle. The technique used for calculating the relative speed between each precipitation object and the own vehicle may be one well known in FMCW radar.

After that, the precipitation determining process is terminated.

As described above, if the following two requirements are satisfied in the precipitation determining process, it is determined that the weather conditions are precipitation conditions of causing rainfall.

One of the requirements is that spectral similarity is not less than the predetermined threshold. The spectral similarity indicates a degree of similarity of the frequency spectra of the respective rising and falling sections with precipitation reference spectra. The precipitation reference spectra herein refer to frequency spectra exhibiting a lower frequency intensity, meaning a longer distance to the source of an incoming wave, and a higher frequency intensity, meaning a shorter distance to the source of an incoming wave.

The inventors of the present invention have conducted intensive studies, and found that the precipitation reference spectra take the spectral shapes as shown in FIG. 4B.

Specifically, in the precipitation reference spectra in the case of receiving an incoming wave from a precipitation object by in-phase detection under precipitation weather conditions, the highest intensity peak of the rising section coincides, as shown in FIG. 4B, with the highest intensity peak of the falling section. Moreover, the frequency intensity of the highest intensity peak of the rising section also coincides with the frequency intensity of the highest intensity peak of the falling section.

The frequency spectrum of the rising section includes a rising low-frequency section toward the highest intensity peak, in which the frequency intensity increases with the increase of the frequency, and also includes a rising high-frequency section, in which the frequency is higher than the highest intensity peak. The rising high-frequency section corresponds to a section with a lower frequency than the rising low-frequency section, in which the frequency intensity decreases.

On the other hand, the frequency spectrum of the falling section includes a falling low-frequency section toward the highest intensity peak, in which the frequency intensity increases with the increase of the frequency, and also includes a falling high-frequency section, in which the frequency is higher than the highest intensity peak. The falling high-frequency section corresponds to a section with a higher frequency than the falling low-frequency section, in which the frequency intensity decreases.

In other words, in the precipitation reference spectra when receiving an incoming wave from a precipitation object by in-phase detection under precipitation weather conditions, the highest intensity peak of the rising section coincides, as shown in FIG. 4B, with the highest intensity peak of the falling section, and the spectral envelope of the rising section and the spectral envelope of the falling section are line symmetric with respect to the highest intensity peaks as the symmetric axis.

Accordingly, in the precipitation determining process of the present embodiment, spectral similarity is determined to be not less than the predetermined threshold if the frequency and the frequency intensity at the highest intensity peak of the rising section coincide with those of the falling section (YES at S360) and both of the slope ratios RRu and RRd are not less than the determination threshold (YES at S380).

The other requirement is that the correlation between the azimuth spectra derived from measurement cycles is not more than a preset threshold.

In the precipitation determining process of the present embodiment, if the autocorrelation matrix normalization error DD is not less than the threshold (YES at S390), the correlation between the azimuth spectra is determined to be not more than the threshold.

(Precipitation Amount Estimating Process)

Next, the precipitation amount estimating process will be described.

Figure 8:
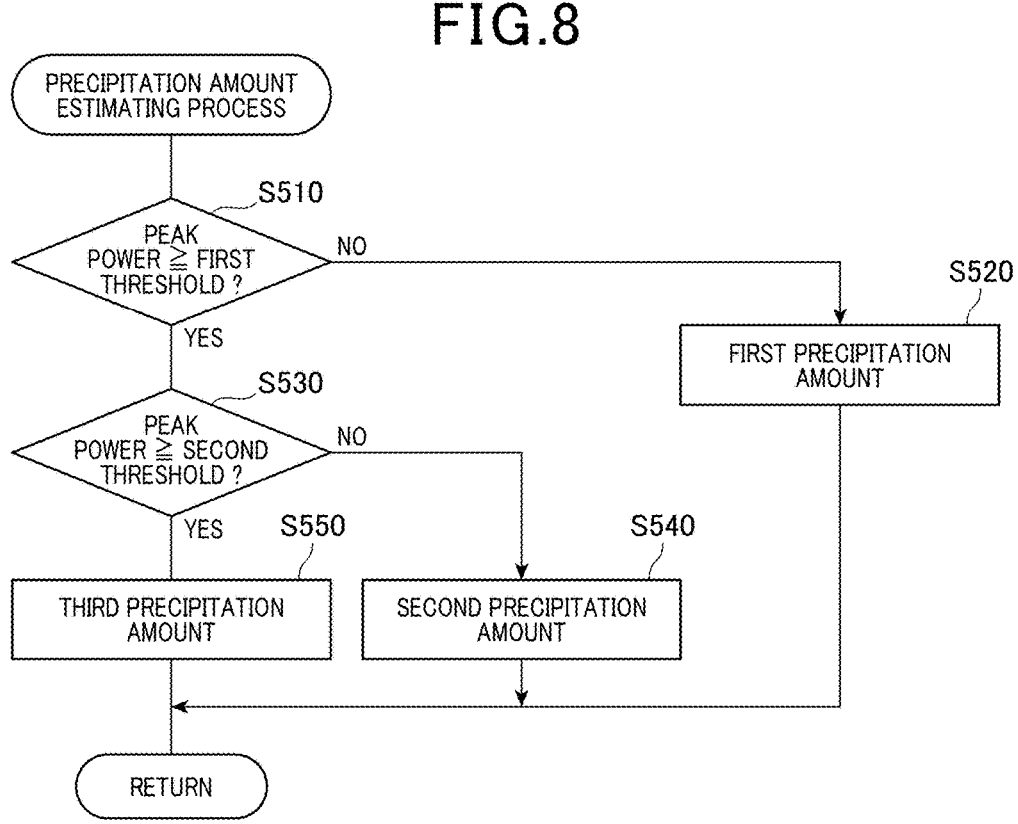
FIG. 8 is a flowchart illustrating a process of a precipitation amount estimating process.

When the precipitation amount estimating process is started at S400 in the precipitation determining process, the signal processor 50 determines first, as shown in FIG. 8, whether the reception intensity of the highest intensity peak (hereinafter referred to as peak power) is not less than a predefined first threshold (S510).

If it is determined, at this S510, that the peak power is less than the first threshold (NO at S510), the precipitation amount is determined to be a first precipitation amount (S520). After that, the precipitation amount estimating process is terminated, and the process proceeds to S410 of the precipitation determining process.

On the other hand, if it is determined, at this S510, that the peak power is not less than the first threshold (YES at S510), the signal processor 50 then determines whether the peak power is not less than a second threshold, which is predetermined as a value larger than the first threshold (S530). If it is determined, at S530, that peak power is less than the second threshold (NO at S530), the precipitation amount is determined to be a second precipitation amount (S540). It should be noted that the second precipitation amount is larger than the first precipitation amount. After that, the precipitation amount estimating process is terminated, and the process proceeds to S410 of the precipitation determining process.

If it is determined, at S530, that the peak power is not less than the second threshold (YES at S530), the precipitation amount is determined to be a third precipitation amount (S550). It should be noted that the third precipitation amount is larger than the second precipitation amount. After that, the precipitation amount estimating process is terminated, and the process proceeds to S410 of the precipitation determining process.

(Advantageous Effects of the Embodiment)

As described above, spectral similarity is determined to be not less than the predetermined threshold in the precipitation determining process of the present embodiment, if the frequency component and the frequency intensity at the highest intensity peak of the rising section coincide with those of the falling section and both of the slope ratios RRu and RRd are not less than the determination threshold (Requirement 1). Moreover, in the precipitation determining process, if the autocorrelation matrix normalization error DD is not less than the set threshold, the correlation between the azimuth spectra is determined to be not more than the threshold (Requirement 2).

The radar device 10 determines precipitation to be present when both of Requirements 1 and 2 are satisfied.

Unlike the conventional art, the radar device 10 is capable of determining the presence/absence of precipitation, irrespective of whether the reflection point of the radar wave is on a stationary object, and irrespective of the number of the reflection points on stationary objects.

Therefore, the radar device 10 can reduce the probability of erroneously determining the weather to be fine when the weather is actually bad (precipitation is present).

In addition, in the precipitation determining process, precipitation is determined to be present/absent in the absence of objects other than precipitation objects from the transmission range of the radar wave.

In other words, the precipitation determining process uses frequency spectra of only the incoming wave obtained in the absence of objects other than precipitation objects to determine the presence/absence of precipitation.

Therefore, the radar device 10 can prevent the presence/absence of precipitation from being determined in a state where the incoming waves from precipitation objects are embedded in the incoming waves from objects other than precipitation objects.

As described above, the radar device 10 can prevent deterioration of accuracy in determining the presence/absence of precipitation, and can further improve accuracy.

When the source of an incoming wave is a vehicle, a roadside object, or the like, positional variation of these objects is small, and hence there is a strong correlation, in terms of temporal transition, between the azimuths in which the object is present. On the other hand, when the source of an incoming wave is a precipitation object, such as a raindrop, a snowflake, or the like, the position of the precipitation object randomly varies. In addition, since the positional variation of the precipitation object is large, there is a weak correlation, in terms of temporal transition, between the azimuths in which the object is present.

Such characteristics are utilized in the precipitation determining process to determine the absence of precipitation if the autocorrelation matrix normalization error DD is less than the set threshold, and to determine the presence of precipitation if the autocorrelation matrix normalization error DD is not less than the set threshold.

Therefore, the precipitation determining process is ensured to further improve the accuracy in determining the presence/absence of precipitation.

Moreover, in the precipitation determining process, the presence/absence of precipitation is determined when the reception intensity of the highest intensity peak in each of the rising and falling sections is not less than the intensity threshold.

In other words, the precipitation determining process is ensured to avoid the determination on the presence/absence of precipitation, if precipitation is highly unlikely to be present, whereby the processing speed is improved.

Furthermore, in the precipitation determining process, the frequency spectrum range used for determining the presence/absence of precipitation is limited to the search frequency range.

Accordingly, the precipitation determining process is ensured to reduce the processing load involved in determining the presence/absence of precipitation.

For example, there may be a situation where the radar device 10 receives an incoming wave from the road surface, with the device's installation axis, e.g. radar's viewpoint direction fixed forward, being misaligned (tilted) to the vehicle height direction. In this case as well, the radar device 10 can prevent the incoming wave from the road surface from being erroneously determined to be an incoming wave from a precipitation object.

This is because the frequency spectra based on an incoming wave from the road surface has the following characteristics which are different from those of the precipitation reference spectra described above in the case of receiving an incoming wave from a precipitation object by in-phase detection under the precipitation weather conditions.

Specifically, the frequency spectra based on an incoming wave from the road surface have characteristics that if the speed of the own vehicle is not less than the speed threshold, the difference in peak frequency between the rising and falling sections becomes large. Moreover, with respect to the frequency peak corresponding to the own vehicle speed, the frequency spectra based on an incoming wave from the road surface have characteristics that, in the rising section, a frequency peak is formed at a shorter-range position than the frequency peak corresponding to the own vehicle speed, and, in the falling section, the intensity is distributed to frequencies in the vicinity of the frequency peak corresponding to the own vehicle speed. Furthermore, the frequency spectra based on an incoming wave from the road surface have characteristics that the frequency peaks in the falling section are spread more widely.

In contrast, precipitation is determined to be present in the precipitation determining process if the frequency and the frequency intensity of the highest intensity peak of the rising section coincide with those of the falling section (YES at S360) and if both of the slope ratios RRu and RRd are not less than the determination threshold (YES at S380).

Specifically, the precipitation determining process is ensured to determine the presence of precipitation by detecting the characteristics specific to the frequency spectra in the case of receiving an incoming wave from a precipitation object under the precipitation weather conditions. Consequently, if the radar device 10 receives an incoming wave from the road surface, with the device's installation axis being misaligned to the vehicle height direction, the precipitation determining process is ensured to prevent the incoming wave from the road surface from being erroneously determined to be an incoming wave from a precipitation object.

In the precipitation determining process, the precipitation object speed is calculated.

If the precipitation object speeds are collected and analyzed by a server that collects information from the in-vehicle systems 1, the weather conditions can be determined for a much wider range of the area where the automobiles are present.

Other Embodiments

An embodiment of the present invention has so far been described. However, the present invention is not limited to the foregoing embodiment but can be implemented in various modes within a range not departing from the spirit of the present invention.

For example, in the object detecting process of the foregoing embodiment, the object specifying process (S160) and the precipitation determining process (S170) are performed in series. In the present invention, however, the object specifying process (S160) and the precipitation determining process (S170) may be performed as a parallel process. The parallel process in this case may be realized such that the object specifying process (S160) and the precipitation determining process (S170) are performed in a so-called multitasking manner by one microcomputer (or a DSP) included in the signal processor 50. The parallel process referred to herein may also be realized by allowing the object specifying process (S160) and the precipitation determining process (S170) to be separately performed by respective microcomputers (or DSPs) included in the signal processor 50.

In the radar device 10 of the foregoing embodiment, an incoming wave is received by in-phase detection (phase detection) to generate beat signals. However, the radar device 10 to which the present invention is applied is not limited to this configuration.

Figure 9:
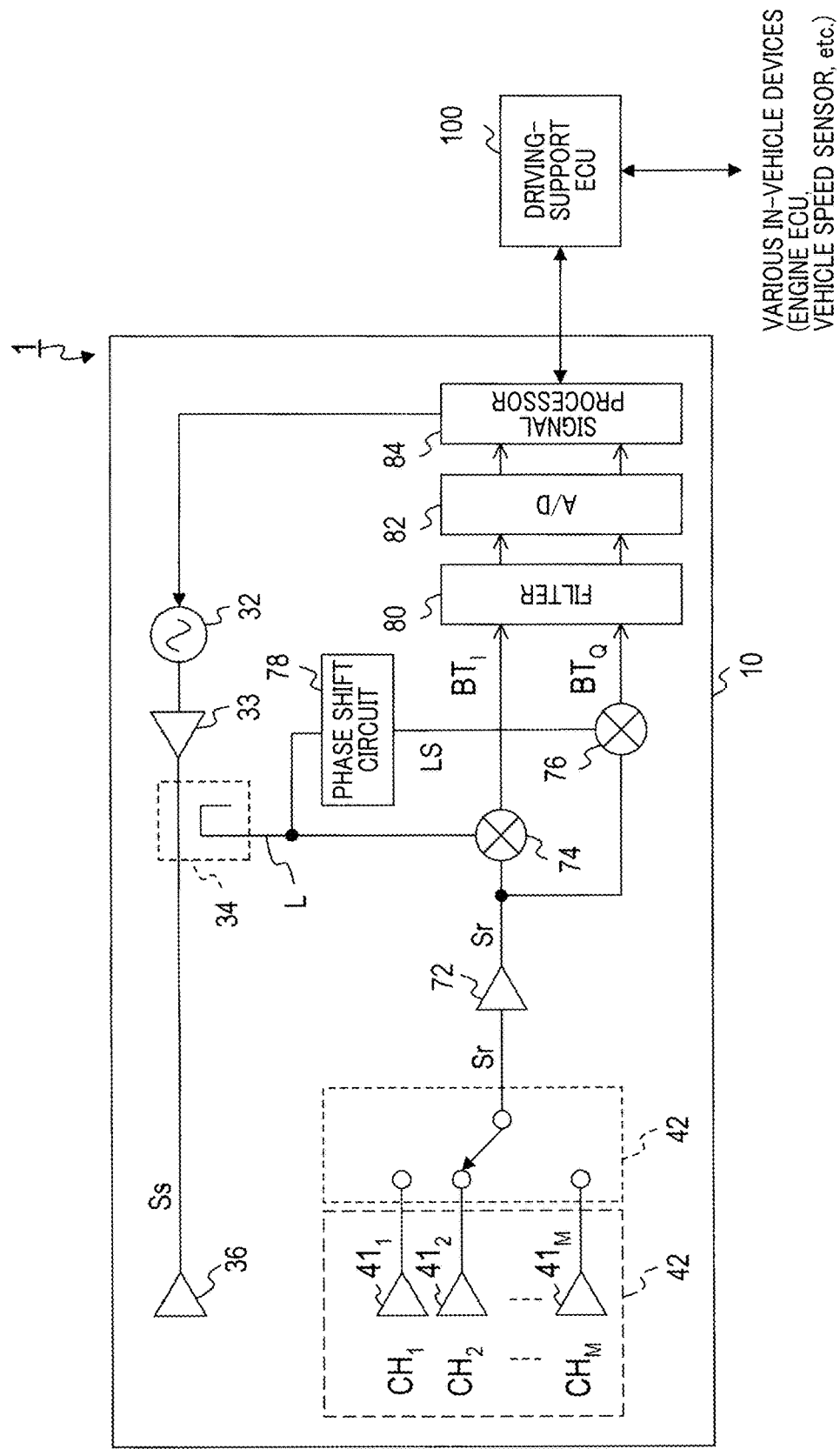
FIG. 9 is a block diagram illustrating a schematic configuration of a radar device according to a modification.

In other words, as shown in FIG. 9, the radar device 10 to which the present invention is applied may include the oscillator 32, the amplifier 33, the divider 34, the transmission antenna 36, the reception antenna unit 40, the reception switch 42, an amplifier 72, mixers 74 and 76, a phase shift circuit 78, a filter 80, an A/D converter 82, and a signal processor 84.

The mixer 74 mixes the reception signal Sr amplified by the amplifier 72 with a local signal L divided by the divider 34 to thereby generate an I signal $BT_I$ that is a real component of the beat signal.

The phase shift circuit 78 is a well-known circuit that shifts the phase of a signal, and shifts the phase of an output from the divider 34 (i.e., the local signal L) by 90° ($\pi/2$ [rad]). The mixer 76 mixes the reception signal Sr amplified by the amplifier 72 with a shifted local signal LS whose phase has been shifted by the phase shift circuit 78, thereby generating a Q signal $BT_Q$ that is an imaginary component of the beat signal.

The filter 80 is a pair of filters that remove unnecessary signal components from the I signal $BT_I$ obtained from the mixer 74 and the Q signal $BT_Q$ obtained from the mixer 76. The A/D converter 82 samples the I signal $BT_I$ and the Q signal $BT_Q$ outputted from the filter 80 for conversion into digital data. The signal processor 84 performs the object detecting process including the precipitation determining process described above.

Specifically, the radar device 10 of the present invention may also be configured to receive an incoming wave by in-phase and quadrature detection (quadrature detection) to generate beat signals, and determine the presence/absence of a target and the presence/absence of precipitation.

Figure 10A:
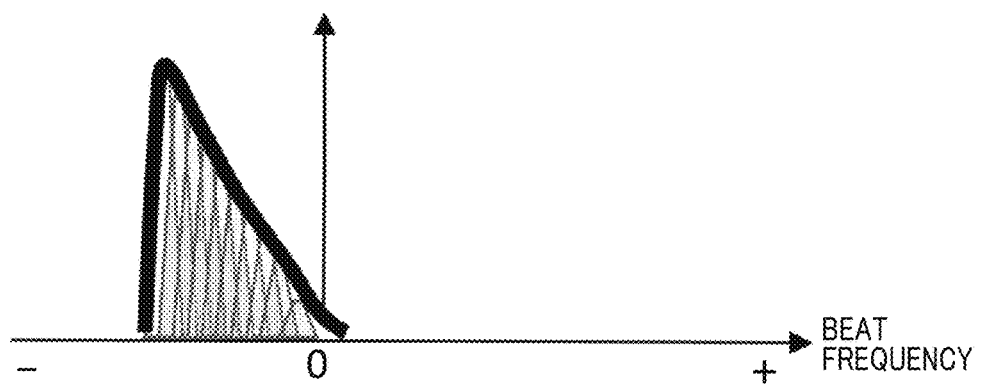
FIG. 10A is a diagram illustrating a principle of determining the presence/absence of precipitation in a radar device according to a modification showing a frequency spectrum in a rising section when the weather condition includes precipitation.
Figure 10B:
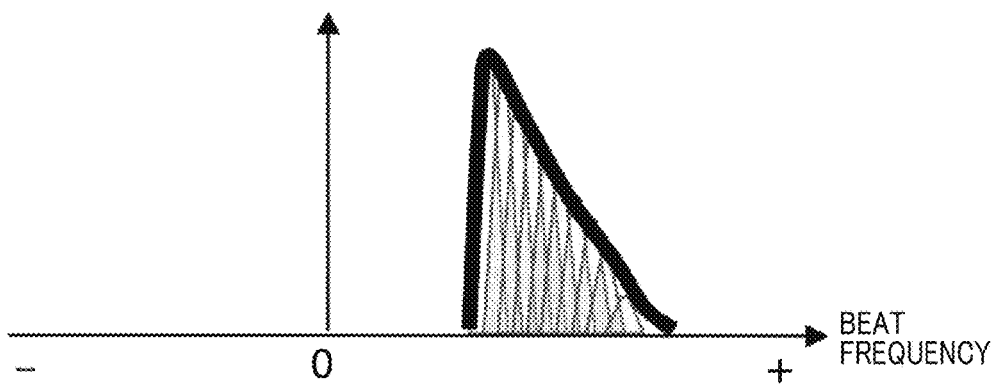
FIG. 10B is a diagram illustrating a principle of determining the presence/absence of precipitation in a radar device according to a modification showing a frequency spectrum in a falling section when the weather condition includes precipitation.

FIG. 10A is a diagram illustrating a frequency spectrum of the rising section under precipitation weather conditions in performing the in-phase and quadrature detection. FIG. 10B is a diagram illustrating a frequency spectrum of the falling section under precipitation weather conditions in performing the in-phase and quadrature detection.

As shown in FIGS. 10A and 10B, it has been found that the frequency spectra of the rising and falling sections under precipitation weather conditions exhibit a lower frequency intensity, meaning a longer distance to the source of an incoming wave, and exhibit that these frequency spectra are similar.

Accordingly, in the precipitation determining process of the radar device 10 shown in FIG. 9, if the frequency spectra in the rising and falling sections exhibit a lower frequency intensity, meaning a longer distance to the source of an incoming wave, and exhibit that these frequency spectra are similar, Requirement 1 mentioned above may be determined to be satisfied.

In the radar device 10 shown in FIG. 9 as well, the accuracy in determining the presence/absence of precipitation can be improved.

The precipitation determining process of the foregoing embodiment includes S390. However, in the present invention, S390 does not have to be necessarily performed. In other words, S390 may be omitted from the precipitation determining process.

In the present invention, all the steps S350 to S380 may be omitted. In this case, a radar device to which the present invention is applied is not limited to FMCW radar.

In other words, a radar device to which the present invention is applied may use a pulse radar or a dual-frequency radar, as long as the radar device includes a transmission part, a reception part and a control part, and is capable of conducting an azimuth analysis. In this case, the transmission part transmits a radar wave at a predetermined measurement cycle. The reception part receives an incoming wave, which is a reflected wave of the radar transmitted by the transmission part, using at least two or more reception antennas. The control part performs the object detecting process on the basis of the transmission/reception signal.

Figure 11:
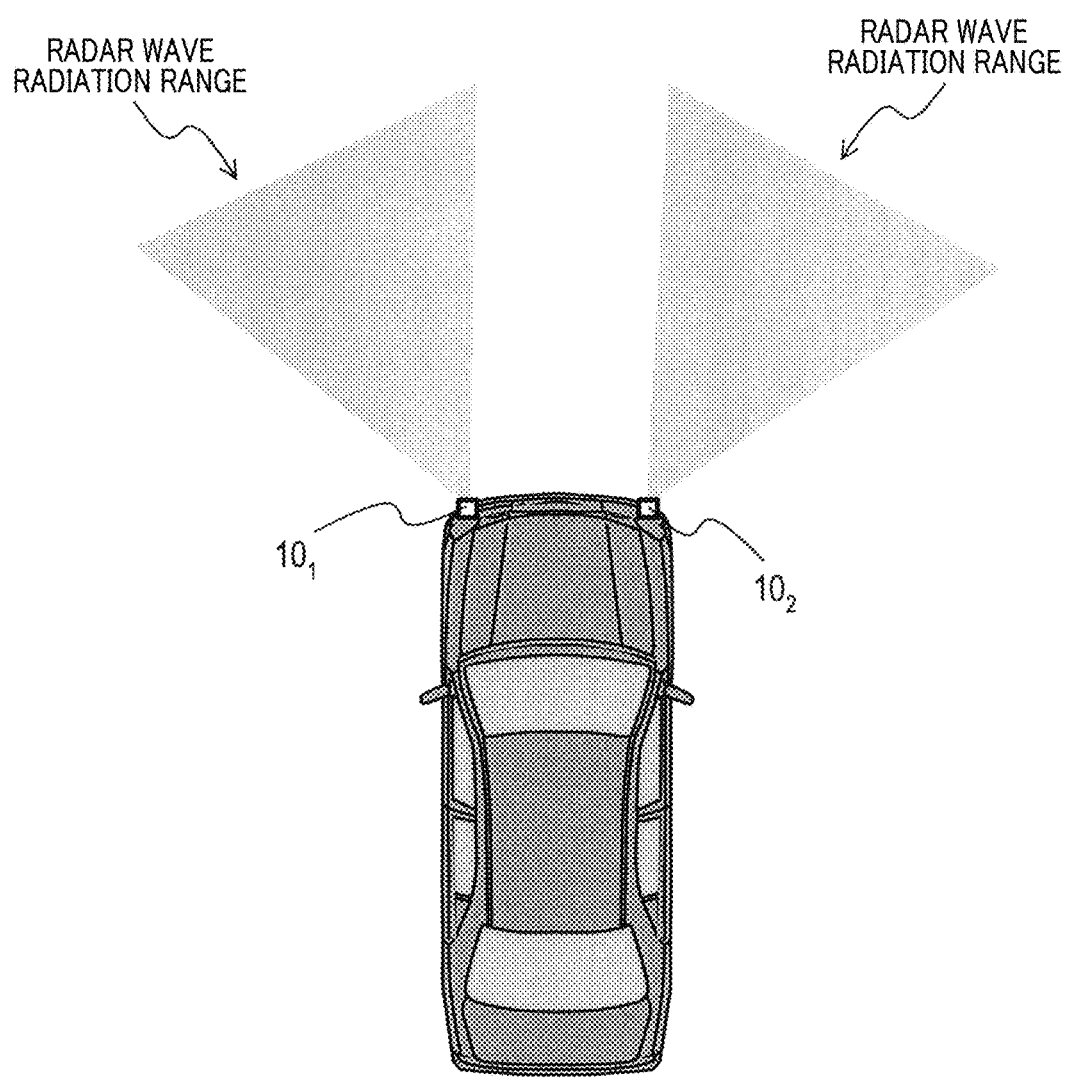
FIG. 11 is a diagram illustrating an arrangement of radar devices according to a modification.

Furthermore, a plurality of radar devices 10 may be mounted to one mobile unit. In this case, as shown in FIG. 11, for example, the radar devices 10 may be mounted to an automobile so as to be located at opposite ends of the front bumper and so as to avoid at least partial overlap of the radiation regions of the radar waves.

When the radar devices 10 are mounted as mentioned above, calculation of the precipitation object speed at S410 in the precipitation determining process of a radar device $10_1$, as one of the radar devices, may make use of the precipitation object speed calculated in a radar device $10_2$, as the other radar device. In other words, when the precipitation object speed is calculated in the radar device $10_1$, the precipitation object speed calculated in the radar device $10_1$ and the precipitation object speed calculated in the radar device $10_2$ may be vector-summed to thereby calculate a precipitation object speed.

In the foregoing embodiment, the object to which the radar device 10 is mounted is a four-wheel automobile. However, the object to which the radar device 10 is mounted in the present invention is not limited to a four-wheel automobile. For example, the object may also be a motorcycle, a bicycle, an aircraft, a ship, and the like. In other words, the object to which the radar device 10 is mounted may be anything as long as it is a mobile unit.

It should be noted that any mode obtained by omitting part of the configuration of the foregoing embodiments should also be an embodiment of the present invention. Moreover, any mode configured by appropriately combining the foregoing embodiments and a modification should also be an embodiment of the present invention. Moreover, any mode conceivable within a range of not departing from the essential features of the invention specified by the wordings recited in the claims should also be an embodiment of the present invention.

Moreover, the present invention can be realized in various modes such as a program executed by a computer to detect the presence/absence of precipitation, a method of detecting the presence/absence of precipitation, and the like, besides the foregoing precipitation determining device.

REFERENCE SIGNS LIST

1: in-vehicle system, 10: radar device, 32: oscillator, 33: amplifier, 34: divider, 36: transmission antenna, 40: reception antenna unit, 42: reception switch, 43, 74, 76: mixer, 44, 72: amplifier, 45, 80: filter, 46, 82: A/D converter, 50, 84: signal processor, 78: phase shift circuit, 100: driving-support ECU.

The invention claimed is:

1. A precipitation determining device mounted to a mobile unit, wherein the device comprises:
   a transmitting means that transmits a radar wave, the radar wave being frequency-modulated such that one measurement cycle has a rising section in which a frequency increases with time and a falling section in which a frequency decreases with time;
   a receiving means that receives an incoming wave which is a reflected wave of a radar wave transmitted from the transmitting means, and mixes the received incoming wave with the radar wave transmitted from the transmitting means to derive respective beat signals for the rising section and the falling section;
   an analyzing means that performs frequency analysis of the beat signals generated by the receiving means and derives respective frequency spectra of the beat signals for the rising section and the falling section; and a precipitation determining means that determines presence/absence of precipitation when the frequency analysis performed by the analyzing means shows absence of an object from a transmission range of the radar wave, the presence/absence of precipitation being determined based on spectral similarity that is a degree of similarity of the frequency spectra with precipitation reference spectra, the frequency spectra being derived from both sections of the rising section and the falling section generated by the analyzing means, and the precipitation reference spectra exhibiting a lower frequency intensity, meaning a longer distance to a source of the incoming wave and a higher frequency intensity, meaning a shorter distance to the source.

2. The precipitation determining device according to claim 1, wherein the receiving means receives the incoming wave by in-phase detection.

3. The precipitation determining device according to claim 2, wherein:

the precipitation determining means uses maximum frequency components in respective frequency spectra derived by the analyzing means as frequency peaks, and uses the frequency component of a frequency peak with a highest intensity among the frequency peaks as a highest intensity peak, and determines the spectral similarity to be not less than a predetermined threshold when requirements are met, the requirements being that a difference between the highest intensity peak of the rising section and the highest intensity peak of the falling section falls within a predetermined range, and that the frequency spectrum of the rising section and the frequency spectrum of the falling section each exhibit a lower frequency intensity, meaning a longer distance to the source of an incoming wave and the frequency spectrum are line symmetric with respect to the highest intensity peaks as a symmetric axis.

4. The precipitation determining device according to claim 1, wherein the receiving means receives the incoming wave by in-phase and quadrature detection.

5. The precipitation determining device according to claim 4, wherein:

the precipitation determining means determines that the spectral similarity is not less than a predetermined threshold when the frequency spectrum in the rising section and the frequency spectrum in the falling section are similar and each exhibit a lower frequency intensity, meaning a longer distance to the source of an incoming wave.

6. The precipitation determining device according to claim 1, wherein the device comprises:

a speed calculation means that calculates a precipitation object speed that is a speed of a precipitation object toward the precipitation determining device, when the precipitation determining means determines that precipitation is present.

7. The precipitation determining device according to claim 1, wherein:

the precipitation determining means includes a range determining means that determines predetermined frequency ranges, as target ranges, in respective frequency spectra of the rising section and the falling section generated by the analyzing means, and uses the target ranges determined by the range determining means as the frequency spectra to determine whether the spectral similarity is not less than the predetermined threshold.

8. The precipitation determining device according to claim 7, wherein the device comprises:

a speed calculation means that calculates a precipitation object speed that is a speed of a precipitation object toward the precipitation determining device, when the precipitation determining means determines that precipitation is present.

9. The precipitation determining device according to claim 8, wherein the device comprises:

a speed acquisition means that acquires a moving speed of the mobile unit, wherein:

the range determining means determines frequency ranges, as the target ranges, in the respective frequency spectra of the rising section and the falling section generated by the analyzing means, the frequency ranges being predetermined based on a frequency that corresponds to a speed obtained by correcting a moving speed acquired by the speed acquisition means with a precipitation object speed calculated by the speed calculation means.

10. The precipitation determining device according to claim 1, wherein:

the receiving means has at least two or more reception antennas that receive the incoming wave;

the precipitation determining device comprises an azimuth deriving means that derives azimuth information in each measurement cycle on the basis of an incoming wave received by the receiving means, the azimuth information indicating an azimuth in which a source of the incoming wave is present; and the precipitation determining means calculates a correlation between pieces of the azimuth information derived by the azimuth deriving means in measurement cycles, and determines the precipitation to be present when the calculated correlation is not more than a preset threshold.

11. The precipitation determining device according to claim 3, wherein:

the precipitation determining means uses a frequency component of a frequency peak with a highest intensity among the frequency peaks as a highest intensity peak, and takes a condition to be one of requirements for determining the spectral similarity being not less than the predetermined threshold, the condition being that a difference between a received power of a highest intensity peak of the rising section and a received power of a highest intensity peak of the falling section falls within a predefined intensity range.

12. The precipitation determining device according to claim 1, wherein:

the precipitation determining means determines whether the spectral similarity is not less than the predetermined threshold when a vehicle speed of the own vehicle is not less than a predetermined speed threshold.

13. A precipitation determining device mounted to a mobile unit, wherein the device comprises:

a transmitting means that transmits a radar wave at a predetermined measurement cycle;

a receiving means that receives an incoming wave using at least two or more reception antennas, the incoming wave being a reflected wave of a radar transmitted by the transmitting means;

an azimuth deriving means that derives azimuth information in each measurement cycle on the basis of an incoming wave received by the receiving means, the azimuth information indicating an azimuth in which a source of the incoming wave is present; and a precipitation determining means that calculates a correlation between pieces of the azimuth information derived by the azimuth deriving means in the measurement cycles, and determines precipitation to be present when the calculated correlation is not more than a preset threshold.

14. The precipitation determining device according to claim 1, wherein:

the precipitation determining means determines the presence/absence of precipitation based on both of a first spectral similarity that is a degree of similarity of the frequency spectra of the rising section with precipitation reference spectra and a second spectral similarity that is a degree of similarity of the frequency spectra of the falling section with precipitation reference spectra.

15. The precipitation determining device according to claim 1, wherein:

the precipitation determining means determines the presence/absence of precipitation in response to a speed of an own vehicle being greater or equal to a speed threshold.

16. The precipitation determining device according to claim 13, wherein:

each reception antenna is configured to be sequentially selected to supply a reception signal derived from the selected reception antenna.

\* \* \* \* \*